United States Patent
Schmidt et al.

(10) Patent No.: US 7,711,959 B2
(45) Date of Patent: May 4, 2010

(54) METHOD FOR TRANSMITTING ENCRYPTED USER DATA OBJECTS

(75) Inventors: Andreas Schmidt, Braunschweig (DE); Markus Trauberg, Velchede (DE)

(73) Assignee: Gigaset Communications GmbH, Munich (DE)

( * ) Notice: Subject to any disclaimer, the term of this patent is extended or adjusted under 35 U.S.C. 154(b) by 1185 days.

(21) Appl. No.: 10/526,042

(22) PCT Filed: Aug. 14, 2003

(86) PCT No.: PCT/EP03/09040

§ 371 (c)(1), (2), (4) Date: Feb. 28, 2005

(87) PCT Pub. No.: WO2004/025437

PCT Pub. Date: Mar. 25, 2004

(65) Prior Publication Data

US 2005/0277403 A1    Dec. 15, 2005

(30) Foreign Application Priority Data

Aug. 26, 2002   (DE) ............................. 102 39 062

(51) Int. Cl.
H04L 9/32 (2006.01)
G06F 7/04 (2006.01)
H04N 7/167 (2006.01)

(52) U.S. Cl. .................. 713/181; 726/2; 726/4; 726/6; 726/7; 726/26; 726/27; 726/30; 726/32; 713/161; 713/165; 713/167; 713/169; 713/171; 713/193; 380/201

(58) Field of Classification Search .......... 713/181; 726/7, 26, 31–32
See application file for complete search history.

(56) References Cited

U.S. PATENT DOCUMENTS 6,389,402 B1 * 5/2002 Ginter et al. .................. 705/51

(Continued)

FOREIGN PATENT DOCUMENTS

EP     1 231 532     8/2002

(Continued)

OTHER PUBLICATIONS

U.S. Appl. No. 60/338,686, 6 pages, filed Dec. 11, 2001.

(Continued)

Primary Examiner—Edan Orgad
Assistant Examiner—Jenise E Jackson
(74) Attorney, Agent, or Firm—Occhiuti Rohlicek & Tsao LLP

(57) ABSTRACT

The present invention relates to a method for handling or transmitting encrypted user data objects. According to such method, a data preparation component (D) of a data preparation system provides user data objects. The data preparation component first encrypts a user data object that has been prepared. It then determines a checksum of the encrypted user data object and creates a container data object (DCF), in which the encrypted user data object and the determined checksum are provided. The container data object is subsequently transmitted to a first telecommunications device (A). Preferably, in order to use the encrypted user data object, the data preparation component (D) transmits descriptive information (BI1) containing a description of the possible usage rights for the encrypted user data object to the telecommunications device (A). After the selection of a specific rights object (RO), the data preparation device first transmits a confirmation object (DCFV) to the telecommunication device in order to verify the compatibility of the desired rights object and the encrypted user data object provided in the telecommunication device and if said verification is successful, subsequently transmits the rights object (RO) to the telecommunications device (A).

24 Claims, 2 Drawing Sheets

U.S. PATENT DOCUMENTS

| | | | |
|---|---|---|---|
| 6,516,413 B1 * | 2/2003 | Aratani et al. | 713/170 |
| 6,807,641 B1 * | 10/2004 | Ishiguro et al. | 714/6 |
| 2002/0023219 A1 * | 2/2002 | Treffers et al. | 713/176 |
| 2002/0107803 A1 * | 8/2002 | Lisanke et al. | 705/51 |
| 2002/0112163 A1 * | 8/2002 | Ireton | 713/176 |
| 2003/0084298 A1 * | 5/2003 | Messerges et al. | 713/176 |
| 2003/0131353 A1 * | 7/2003 | Blom et al. | 725/25 |
| 2004/0039916 A1 * | 2/2004 | Aldis et al. | 713/177 |
| 2008/0244751 A1 * | 10/2008 | Peinado | 726/26 |
| 2009/0187995 A1 * | 7/2009 | Lopatic | 726/31 |
| 2009/0228718 A1 * | 9/2009 | Manferdelli et al. | 713/190 |

FOREIGN PATENT DOCUMENTS

| | | |
|---|---|---|
| JP | 2001-117880 A | 4/2001 |
| JP | 2002-112196 A | 4/2002 |
| WO | WO 00/58811 A2 | 10/2000 |
| WO | WO 02/51057 | 6/2002 |
| WO | WO 02/060110 A2 | 8/2002 |

OTHER PUBLICATIONS

Tomohiro Nishiya: Vergebührungssystem für Inhalte bei Hybrid-P2P, Vorträge und Abhandlungen (4) in der 64. Nationalversammlung (2002), Information Processing Society of Japan, Seiten 3-445 bis 3-446, Mar. 12, 2002.

* cited by examiner

METHOD FOR TRANSMITTING ENCRYPTED USER DATA OBJECTS

CROSS-REFERENCE TO RELATED APPLICATIONS

This application is a U.S. national stage application of International Application No. PCT/EP03/09040 filed Aug. 14, 2003, which designates the United States of America, and claims priority to German application number 102 39 062.2 filed Aug. 26, 2002, the contents of which are hereby incorporated by reference in their entirety.

BACKGROUND OF THE INVENTION

The present invention relates to a method for handling (in particular, transmitting) encrypted user data objects which are provided by a data provisioning component and transmitted to a telecommunications device such as, for example, a mobile phone. Specifically, the present invention relates to a method which enables a user of the telecommunications device to download different rights or rights objects from the data provisioning component to the telecommunications device in return for an appropriate charge.

A method or, as the case may be, a service for reliable and accountable downloading of user data objects to a telecommunications device, in particular in the embodiment of a mobile radio device or mobile phone, in a data communications network is currently under discussion. In a proposed scheme, the downloading of the user data objects to the mobile radio device is intended to be implemented via a protocol specified by the WAP Forum (WAP: Wireless Application Protocol) or an Internet protocol (e.g., Hypertext Transfer Protocol: HTTP). The downloading service is specified here in such a way that a user with an application program which is available on the mobile radio device and which is referred to as a download client is to be allowed to download any user data objects which are provided by one or more data provisioning components, particularly servers or, as the case may be, download servers of service providers or content providers in the data communications network. A possible embodiment of the service makes provision for a downloadable user data object to be provided with restrictions in relation to its usage by the user of the mobile radio device. This can be used, for example, to restrict the number of uses of the user data object or also the usage period. The practical implementation is effected by the description of the restrictions using a suitable language such as, for example, ODRL (Open Digital Rights Expression Language), whereby the download client or another special application, called a DRM agent, receives the rights description for management of the rights associated with a (digital) user data object (DRM: Digital Rights Management), evaluates it, stores it in a protected memory area that is not accessible to the user on the mobile radio device and, in response to a request by the user to use the object, grants or does not grant such rights in accordance with the rights description. The user data object itself can be protected against unauthorized access either by being stored in encrypted form in a freely accessible memory area on the mobile radio device or by being managed by a special application, such as the DRM agent, which does not allow any unauthorized access to the object by the user.

According to a variant specified by the WAP Forum for the management of DRM-protected contents, a user data object provided by a data provisioning component is encrypted and finally packed for transport and storage onto a telecommunications device such as a mobile radio device in a so-called container file or a so-called container object (which, for example, has been assigned the data type or content type "Application/VND.OMA.DRM.Content"). Through the use of a service for reliable downloading of content by a data provisioning component (content download), the encrypted user data object is packed in the container object and transmitted to the telecommunications device using WAP protocols (such as, for example, the WSP: Wireless Session Protocol) or Internet protocols (such as, for example, the HTTP). A so-called rights object is transmitted to the telecommunications device separately from the encrypted user data object; for example, via a WAP push. The rights object contains a description of the rights granted to the user for using the encrypted user data objects, a reference to the container object which enables the rights object to be assigned to the corresponding container object, and a key by which the encrypted user data object can be decrypted so that it subsequently may be used. A special device or application, which may be the above-mentioned DRM agent, is necessary on the telecommunications device, such as the mobile radio device, in order to use the combination of the encrypted user data object packed in the container object and the rights object. After the transmission of the rights object to the telecommunications device, the rights object is transferred directly to the DRM agent which is responsible for the management and safekeeping of the secret; namely, the key for decrypting the encrypted user data object. In practice, the DRM agent stores the rights object on the telecommunications device and protects it against unauthorized access by other applications or users. The first step when an encrypted user data object is to be used is that the DRM agent is activated.

The latter searches for a rights object that matches the container object in the memory area managed by it in the telecommunications device on the basis of the identification contained in the container object and also in the rights object, checks whether rights can be granted for the requested usage type (such as, for example, "playing back" music data or "displaying" image data, etc.) and decrypts the user data object using the key from the rights object if the rights can be granted. Pursuant to the above described method, wherein an encrypted user data object and a rights object separate therefrom can be used, the value of digital data is no longer represented by the encrypted user data object or the container object itself, but rather by the rights object and the key contained therein, without which, of course, the encrypted user data object cannot be used. Thus, in this case the encrypted user data objects can be stored in packed form in the container objects on the telecommunications device and be freely accessible. This also allows encrypted user data objects, packed in container objects, to be forwarded by a user to one or more other users, a process referred to as "superdistribution".

In order to make the encrypted user data object contained in a forwarded container object usable, an individual user must download a suitable rights object from a rights provider that may be identical to the content provider providing a specific user data object.

The method just described, in which in order to make user data objects usable it is necessary firstly to download a container object containing an encrypted user data object, and secondly to download a rights object from an identical or from different data provisioning component(s), does, however, have the disadvantage that before downloading a rights object a user has no way to check whether the rights object offered, for example, by an arbitrary provider does in fact enable the use of the encrypted user data object which is already present, stored in the container object, on the user's own telecommunications device; i.e., whether the offered rights object includes, for example, the right key for decrypting the encrypted user data object contained in the container object. A further disadvantage is that a user without a purchased or downloaded rights object has no way whatsoever to check whether the encrypted user data object received by his or her telecommunications device or even the entire container object is undamaged.

Accordingly, the present invention seeks to provide a method by which a user is rendered capable of checking the integrity or, as the case may be, usability of an encrypted user data object stored on his or her telecommunications device.

SUMMARY OF THE INVENTION

With a method for handling and/or transmitting encrypted user data objects, wherein a data provisioning component provides user data objects, a user data object of such kind is first encrypted in order to protect it against an unauthorized access. Next, a checksum of the encrypted user data object (or of the entire container object) is determined. This can be calculated, for example, via a conventional hash algorithm. A container file or container object which has a content section and a description section is also generated. The encrypted user data object is provided in the content section of the container object, while the checksum just determined is provided in the description section. The container object thus contains two data areas which are accommodated independently of each other, yet are related in terms of their content (encrypted user data object associated with the checksum determined by such object) and, therefore, permit an integrity check in a comparison of this data. Finally, the generated container object is transmitted to a first telecommunications device of a first user.

It should be noted here that it is possible that the still unencrypted user data objects are provided by a first data provisioning component, while they are encrypted by a second data provisioning component connected to the first data provisioning component and are packed together with a checksum determined in this regard into a container object and finally offered to a user for downloading to his or her telecommunications device. In a case such as this, rather than referring to one or more individual data provisioning components it is also possible to speak of a data provisioning system which includes the individual data provisioning components for providing user data objects or, as the case may be, for encrypting, packing and providing user data objects. In addition to the possibility that a container object is transmitted directly by a data provisioning component or, as the case may be, a data provisioning system to a telecommunications device assigned to a user, it is also possible that the container object reaches the first user or the latter's telecommunications device via one or more second or further telecommunications devices of other users.

A container object generated, for example, according to the above method in a data provisioning component is advantageously analyzed after its reception by the first telecommunications device in such a way that the checksum provided in the container object is first extracted from the description section of the container object. Next, the checksum is determined a second time from the encrypted user data object provided in the content section of the container object. The checksum just determined a second time is then compared with the extracted checksum so that, in the event that the two checksums tally, it can be concluded that the encrypted user data object has been transmitted correctly or, as the case may be, that the user data object is undamaged. This type of analysis of a received container object can be performed by a special application of the (first) telecommunications device which is specially designed for managing usage rights for digital data or data objects; i.e., a so-called DRM agent (DRM: Digital Rights Management). Such a comparison of the extracted and newly determined checksums thus enables it to be confirmed whether, particularly, in the case of a superdistribution of container objects, an encrypted user data object has been incompletely transmitted or whether a user data object has been, for example, selectively tampered with.

It should be noted that it is possible that not just one encrypted user data object may be provided in a container object or, as the case may be, in its content section, but also a number thereof. Accordingly a checksum must be determined in each case for the number of encrypted user data objects, with the respective checksums having to be provided in the description section of the container object. In an integrity check, finally, the respective checksum of each encrypted user data object to be analyzed then may be determined and compared with the respective checksum provided in the description section. In this way it is possible to combine, for example, a number of related user data objects (linked, for example, on the basis of their related subject matter, such as images of the same object at different resolutions) in a single container object and transmit such container object.

In order to be able to use an encrypted user data object which is packed in a container object and has been provided or received on a telecommunications device, it is also necessary to provide a rights object which firstly has assignment information for assigning the rights object to an encrypted user data object or to a container object which contains the encrypted user data object. The rights object must also contain decryption information for decrypting the encrypted user data object in order to make the user data object usable for the user; i.e., to permit a music file to be played back, for example. The rights object can further include rights information for describing the usage rights of the encrypted user data objects. In this case, the usage rights can include, for example, how long the use of a user data object is permitted, how often such use is permitted or, such as in the case of a multimedia user data object, the use of which medium is permitted during such use (in the case of a video clip with musical accompaniment, for example, whether just the music may be listened to or whether the associated video clip also may be viewed). The rights object can be generated, for example, by a data provisioning component which also provides or generates the container object, but it also can be generated by a different data provisioning component which is, in turn, part of a higher-level data provisioning system, for example.

Since, as already mentioned, the value of an encrypted user data object depends on the assigned rights object which grants the user the usage rights for the user data object, a provider of rights objects (which also may be identical with the provider of user data objects) will charge a user for a rights object immediately after transmitting the rights object to the user or the latter's telecommunications device. As such, the user, who can choose from a number of rights objects, for example, therefore would have no way to check whether the chosen rights object matches the encrypted user data object stored on his or her telecommunications device before he or she downloads the rights object and has to pay for it. Thus, in order to enable a user to check, prior to the transmission or downloading of a specific rights object, whether the rights object actually permits the use of the encrypted user data object present in the container object on his or her telecommunications device (i.e., whether the specific rights object will contain the right key for decrypting the encrypted user data object) according to an advantageous embodiment a verification object or confirmation object assigned to the rights object is generated which has assignment information for assigning the rights object to an encrypted user data object and a checksum of the encrypted user data object. As such, a confirmation object is generated in the data provisioning system, particularly by the data provisioning component which also provides the rights object, which confirmation object does not enable a decryption of an encrypted user data object, but permits a compatibility check to determine whether a rights object assigned to the confirmation object matches or is compatible with a user data object that is present on the user's telecommunications device.

In this regard, according to a further advantageous embodiment of the present invention, a request is submitted on the part of the first telecommunications device to the data provisioning system of a content provider or a data provisioning component of such system to the effect that the confirmation object assigned to a specific rights object is transmitted to the first telecommunications device. The confirmation object is then transmitted by the data provisioning component or, as the case may be, the data provisioning system to the first telecommunications device, where finally the checksum is extracted from the confirmation object. A comparison now can be made between the checksum extracted from the confirmation object and the newly determined checksum or the checksum provided in the description information of the container object in order to be able to conclude, in the event that the checksums tally, that the rights object assigned to the confirmation object and the encrypted user data object transmitted in the container object to the first telecommunications device are compatible. As such, it is now possible, without having to transmit the actual rights object, to check via the confirmation object assigned to the rights object or via the checksum provided therein whether the rights object is compatible with the user data object provided from the telecommunications device. It is possible here that the integrity check on the encrypted user data object contained in the container object can be performed before the request for the confirmation object, during the request or after the request for the confirmation object. However, the integrity check is advantageously performed after reception of a container object and prior to a request for a confirmation object or rights object in order not to have to make the request for confirmation or rights objects unnecessarily in the event of a defective or erroneous encrypted user data object or container object.

If the check on the confirmation object with regard to the encrypted user data object present in the container object is completed with a positive result, the first telecommunications device can send the positive check result in the form of a status report to the data provisioning component providing the confirmation object or, as the case may be, the rights object assigned thereto. The data provisioning component can thereupon independently transmit the associated rights object to the first telecommunications device. It also is, however, possible that the first telecommunications device does not immediately send off a status report concerning the successful check on the confirmation object, but sends a request message at a later, self-determined time to the data provisioning component providing the rights object assigned to the confirmation object so that finally said the data provisioning component transmits the rights object to the first telecommunications device. It is, however, also possible that the first telecommunications device directly requests a specific rights object from a data provisioning component providing such rights object via a request message provided for the purpose, only after an integrity check on a received container object.

According to a further embodiment, in a method for handling or, as the case may be, making usable encrypted user data objects, an encrypted user data object is provided in a first telecommunications device; for example, in that it has been transmitted by a data provisioning component or a further telecommunications device and has possibly been checked for integrity according to an above method. The telecommunications device then requests description information relating to the content of the encrypted user data object from a data provisioning component. The requested description information is then transmitted to the first telecommunications device by the data provisioning component. A check is now made in the telecommunications device to verify whether the content with attributes specified in the description information can be used by the first telecommunications device. If the check on the attributes specified in the description information is successful, a confirmation object is requested from the data provisioning component, which confirmation object is assigned to a rights object (RO) assigned to the encrypted user data object in order to check the compatibility of the rights object and the encrypted user data object. Through the request for the description information it is now possible that the telecommunications device first checks whether the stored user data object is usable at all (if, for example, the telecommunications device has no means of outputting audio or music, a user data object having a music content would not be usable on the telecommunications device).

Advantageously, the rights object is transmitted by the data provisioning component to the first telecommunications device upon successful checking of the compatibility of the rights object and the encrypted user data object.

The encrypted user data object can be provided in a content section of a container object. The container object also may have a description section in which a checksum of the encrypted user data object is provided. Moreover, the address of the data provisioning component for requesting the description information and/or the confirmation object also may be provided in the description section of the container object.

Advantageously, the confirmation object has a checksum of the encrypted user data object, whereby the check on the compatibility of the rights object and the encrypted user data object is performed according to the following steps. The checksum is extracted from the confirmation object. Next, the checksum extracted from the confirmation object is compared with the checksum provided in the description section of the container object in order to be able to conclude, in the event that the two checksums tally, that the rights object assigned to the confirmation object and the encrypted user data object provided in the container object on the first telecommunications device are compatible.

As mentioned already, it is possible that, in the event of a successful compatibility check of the confirmation object assigned to the rights object and the encrypted user data object transmitted in the container object on the first telecommunications device, a first confirmation message can be transmitted from the first telecommunications device to the data provisioning component providing the rights or confirmation object. It is furthermore possible that, providing no check of the rights object is performed using a confirmation object, a second confirmation message is sent by the first telecommunications device to the data provisioning component when the first telecommunications device has received the rights object from the data provisioning component.

According to a further advantageous embodiment, the user of the first telecommunications device is then charged on the basis of the reception of the first and/or second confirmation message from the data provisioning component for the transmitted rights object or, as the case may be, the user is sent charging information so that he or she can pay for the received rights object.

According to a further advantageous embodiment, the first and/or the further telecommunications devices and the data provisioning system including the data provisioning components provided therein (for container objects, confirmation objects or rights objects) are part of a telecommunications network. It is possible in this case that the first and the further telecommunications devices are in each case part of a telecommunications network, whereby the individual telecommunications devices do not have to be part of the same telecommunications network. Accordingly, a data provisioning component of the data provisioning system, which component is particularly embodied as a data server of a service provider or content provider, can be provided in a telecommunications network which is connected to the telecommunications network or networks which are assigned to the first and the further telecommunications devices.

In order to be able to use the method for transmitting user data objects as flexibly as possible, the first and/or the further telecommunications devices may be embodied as a mobile telecommunications device and, at the same time, include a radio module or mobile radio module. In this case, the telecommunications device can be embodied, for example, as a mobile phone, a cordless telephone, a smartphone (combination of a small portable computer and a mobile phone), a PDA (PDA: Personal Digital Assistant) or an organizer. Furthermore the telecommunications devices also may include other devices that are accessible in a mobilemanner, such as a personal computer (PC) or a laptop which can be accessed via a mobile radio network by a connected mobile radio device (mobile phone). The mobile radio device then may be connected to the personal computer or laptop, for example, via a cable or contact said devices wirelessly via an infrared interface or a local Bluetooth network. In this case the first and/or also the further telecommunications devices including the telecommunications network assigned to these can operate in the embodiment of a mobile radio network conforming to the GSM (Global System for Mobile Communication) standard or the UMTS (Universal Mobile Telecommunications System) standard. Such mobile radio networks or telecommunications devices conforming to the GSM or UMTS standard can represent a platform for WAP protocols or the WAP protocol stack (WAP: Wireless Application Protocol) via which data (messages and/or user data objects) can be transmitted in the respective mobile radio network. In the case of the use of the WAP protocol stack it is possible, through the use of a WAP gateway as the interface between a mobile radio network and another network, such as a network based on an Internet protocol, to establish a connection to such network. In this way, it is possible that the data provisioning component is situated in a network based on an Internet protocol, such as the Internet, whereby the data (messages, user data objects) can be transmitted via a WAP gateway and finally via an air interface of a mobile radio network between the base station(s) of the mobile radio network and to the respective telecommunications devices.

According to an advantageous embodiment, the user data objects can be data in the form of text data, image data or, as the case may be, video data, audio data, executable programs or software components or a combination of these data types; i.e., multimedia data or content.

Additional features and advantages of the present invention are described in, and will be apparent from, the following Detailed Description of the Invention and the figures.

DETAILED DESCRIPTION OF THE INVENTION

A method proposed by the WAP Forum or its successor organization OMA (OMA: Open Mobile Alliance) for downloading or transmitting any data objects to telecommunications devices such as mobile radio devices or mobile phones and for managing the rights for the digital user data objects essentially consists of two sections; namely, the actual downloading or transmission of the user data objects ("content download") and the management of the digital rights ("Digital Rights Management").

Figure 1:
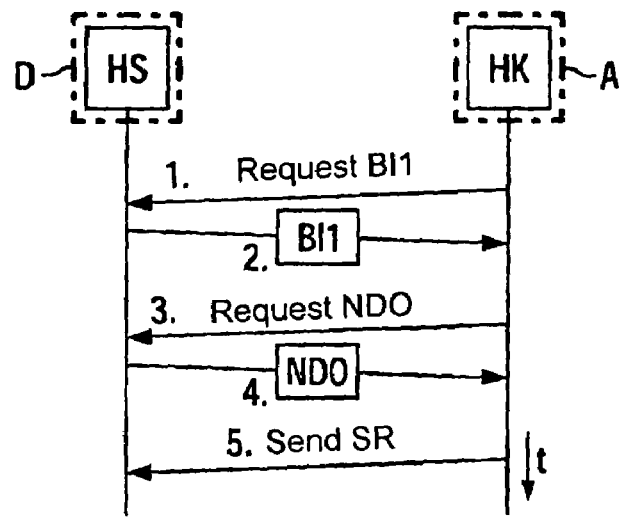
FIG. 1 is a block diagram showing the components involved in a method for downloading user data objects including the data flow between the components.

As can be seen in FIG. 1, a telecommunications arrangement for performing a method for downloading or transmitting user data objects includes a data provisioning component for providing user data objects and a first telecommunications device A. In the example, the telecommunications device is embodied as a mobile phone which can operate in accordance with the GSM or UMTS standard. It is further assumed that the mobile phone A is part of a mobile radio network. The mobile phone A is able to use WAP protocols (e.g., Wireless Session Protocol: WSP, etc.) or the WAP protocol stack in order to transmit data over an air interface to a corresponding stationary transmit/receive arrangement of the mobile radio network assigned to the mobile phone A. The data provisioning component D can be provided in the mobile radio network assigned to the mobile phone A or can be provided, for example, in the Internet, which is connected to the mobile radio network of the mobile phone A via corresponding WAP gateways. Although it is possible that a user data object can be transmitted from the data provisioning component D to the mobile phone A not only directly, but also via further data provisioning components which together form a data provisioning system, or even can be transmitted via further mobile phones, the direct transmission of user data objects from the data provisioning component D to the mobile phone A shall be explained in the following description for the sake of simplicity.

As can be seen in the components identified in FIG. 1, two logical units are required for a method for transmitting or downloading user data objects; namely, firstly a so-called "download server" and secondly a so-called "download client":

1.) The download server HS, which is implemented, in particular, via a software application or a software program on a data provisioning component such as a data server, is responsible on the one hand for providing the download clients on a telecommunications device or a mobile phone firstly with description information relating to a specific object managed by the download server. Description information of this kind is also referred to as meta data or as an object description. Based on a request by a user of a download client on the user's telecommunications device, the download server delivers a desired user data object to the client. In the process the download server can take into account previously optionally transmitted attributes of the download client or the telecommunications device on which the client is executed or a device connected to the telecommunications device by selecting a user data object matched to the attributes or generating such an object specifically for the download client which is serving as the current recipient.

2.) The download client HK represents, in particular, a software application on a telecommunications device such as the mobile phone A or an application on a data management device connected to the telecommunications device such as, for example, a portable computer or a PDA. The download client first negotiates the delivery of a desired user data object with the download server, receives such object and confirms its error-free reception to the download server and possibly also the usability of the received content on the telecommunications device or the mobile phone A, as used in the example.

The process for downloading or transmitting user data objects from the download server to the download client, as will be explained further below in relation to FIG. 1, is designed so as to fulfill the following requirements.

Before a user downloads a user data object from a data provisioning component he or she must, as already mentioned, first be informed about the attributes of the user data object (for example, through an object description or description information). Corresponding information can include such things as: the name of the user data object, the data volume for the transmission of the user data object (e.g., in bytes), a verbal description of the user data object, and any further attributes of the user data object to be downloaded.

The user must be able to issue his or her explicit approval (acceptance of the offer by the data provisioning component) for the delivery and possible charging of the user data object.

Reference is made once again to FIG. 1, in which the process of downloading a user data object is presented in detail, whereby the message flow and action sequence in time is identified by the numbers on the arrows in FIG. 1.

1.) The download client HK on the mobile phone A requests description information BI1 from the download server of the data provisioning component D, which contains the object description or meta data relating to a specific user data object.

2.) The description information BI1 is transmitted to the download client HK by the download server HS. Based on the received description information the usability of the described user data object on the mobile phone A of the user can be checked and the approval of the user obtained for downloading the user data object (not shown explicitly here).

3.) The download client HK requests the user data object NDO from the download server HS.

4.) The download server HS sends the chosen user data object to the download client HK.

5.) The download client HK, for its part, sends a status report SR back to the download server HS.

According to an embodiment already described in the introduction for preventing an unauthorized access to a user data object or an unauthorized use of a downloaded data object, a user data object is encrypted by a data provisioning component of a data provisioning system and provided together with a checksum of the user data object in a container object or a container file. Container objects of this kind then may be transmitted according to the same method as already shown, for example, for unencrypted user data objects in FIG. 1.

Starting from a case of this kind, in which an encrypted user data object provided in a container is present on a user's telecommunications device, it is now necessary for the user of the telecommunications device to obtain the rights to use the transmitted container object. According to the embodiment described in the following, such rights can be transmitted by the data provisioning component to the user's telecommunications device via a rights object. Such a rights object, which also will be explained later in relation to FIG. 4, includes, for example, a description of the rights which are granted to the user in order to use the encrypted user data object provided in the container object, a reference to the container object which enables an assignment of the rights object to the corresponding container object, and a key with which the encrypted user data object can be decrypted so that it subsequently can be used. As will be explained further in relation to FIG. 2, it is necessary, in order to use the combination of the encrypted user data object, a container object and a rights object, for a special device or software application to be provided on the user's telecommunications device, which device or software application is referred to as a so-called DRM (Digital Rights Management) agent. The DRM agent receives the rights object which has been transmitted by a data provisioning component to the telecommunications device and is responsible for the management of the rights object or, as the case may be, for the safekeeping of its secret, i.e., the key for decrypting the encrypted user data object in the container object. In practice, the DRM agent must store the rights object on the telecommunications device and protect it against unauthorized access by other devices or applications. In a method to be explained below in FIG. 2, according to an embodiment of the present invention in which rights or rights objects are transmitted to a telecommunications device of a user irrespective of user data objects (packed in container objects and encrypted), the following criteria are to be taken into account:

A check of the integrity or, as the case may be, freedom from damage of a container object or the encrypted user data object contained in such container object shall be possible even if the container object has been transmitted to the telecommunications device of a user by "superdistribution" and potentially comes from an unreliable source. For this purpose, according to a preferred embodiment of the present invention, a checksum of the encrypted user data object is inserted as an additional information element into a description section of the container object by a data provisioning component (see also FIG. 3). In this case, the checksum also can be calculated by a hash function or a hash algorithm. Here, from a data object of arbitrary size, a hash function can calculate a character string of fixed length (e.g., 128 or 160 bits) with the following attributes. The character string is unique to the data object ("digital fingerprint"). Even changing a single bit of the data object results in a totally different hash value. The original data object cannot be reconstructed from the hash value. It is practically impossible to find two data objects that produce the same hash value. Alternatively, the checksum or the hash value also may be calculated over the entire container object. The above-mentioned DRM agent for managing rights of a user data object on a user's telecommunications device can thus check the integrity or freedom from damage of the encrypted user data object only on the basis of the container object by using the defined and generally known algorithm for calculating the checksum or the hash value to calculate precisely this checksum/hash value for the encrypted user data object or the entire container object and comparing it with that in the container object.

The user shall be able to request new rights or rights objects for an encrypted user data object, packed in a container object, provided on his or her telecommunications device. For this purpose, a resource ("rights issuer") can be specified in the container object or, more precisely, in its description section (cf. FIG. 3), from which the DRM agent starts to download a rights object, corresponding to the downloading of user data objects shown in FIG. 1. This enables rights or rights objects to be downloaded to the telecommunications device with the reliability corresponding to the "normal" download process for user data objects. To put it more precisely, there can be provided in the description section of the container object a URL (URL: Uniform Resource Locator) which specifies, for example, an "address" of a specific data provisioning component which may be identical to the data provisioning component for user data objects. As a result of the invocation of the specified URL by one of the applications, download client or DRM agent, a user can be provided (via a menu structure, for example) with an offer of one or more different rights, whereby the user can have delivered to him or her via a download process or can purchase a specific right or specific rights in the form of rights objects. The user is thus offered a familiar interface and manner of operation such as he or she already knows from the downloading of user data objects to his or her telecommunications device, which increases the confidence in the service.

In order to guarantee that a specific selected rights object (which is located on a data provisioning component) matches a container object residing on the telecommunications device of a user or the encrypted user data object packed therein, and in order therefore to prevent an incorrect rights object, for which he or she must still pay, being transmitted to a user of a telecommunications device, a confirmation object ("verifier object") assigned to the rights object is to be transmitted first to the telecommunications device of the user instead of the rights object. This confirmation object contains the checksum or hash value of the encrypted object, packed in a container object, that is already present on the telecommunications device of the user or the checksum (the hash value) of the container object. The confirmation object further may contain an identification designation for the container object to be checked so that the DRM agent responsible for rights management is able to check that the right container object is stored on the telecommunications device of the user. As such, a new object type, namely that of the confirmation object, is defined, by which DRM-relevant data can be transmitted from the download server of a data provisioning component to the DRM agent of a telecommunications device without the need to transmit the actual rights object itself. In this way, a separation of DRM-relevant data and content-related data and an implementation of an essentially identical execution of the download process for additional rights or rights objects are created with an additional guarantee of the relatedness of the encrypted user data object already present on the telecommunications device of a user and the rights object to be downloaded.

According to a possible embodiment of the explained variant, already prior to or during the request for new rights or rights objects the DRM agent checks the checksum or hash value relating to the container object or encrypted user data object packed therein for correctness and/or integrity. This reduces the overhead for checking the checksum or hash value following reception of the confirmation object to a comparison between the just checked or, as the case may be, newly determined checksum (or hash value) and the checksum (or hash value) provided in the confirmation object. In this way, the time period for sending a status report to the download server on completion of the comparison or the time for requesting the actual rights object then may be reduced.

If the check of the checksum (or hash value) transmitted by the confirmation object is negative, that is, if the checksum provided in the confirmation object does not tally with the checksum, newly determined by the DRM agent, of the encrypted user data object or the entire container object, the process of downloading the actual rights object can be interrupted. As a result, the user of the telecommunications device who wanted to download a rights object is protected from downloading a rights object that he or she cannot use, and so is protected from having to pay for such unusable rights object.

Figure 2:
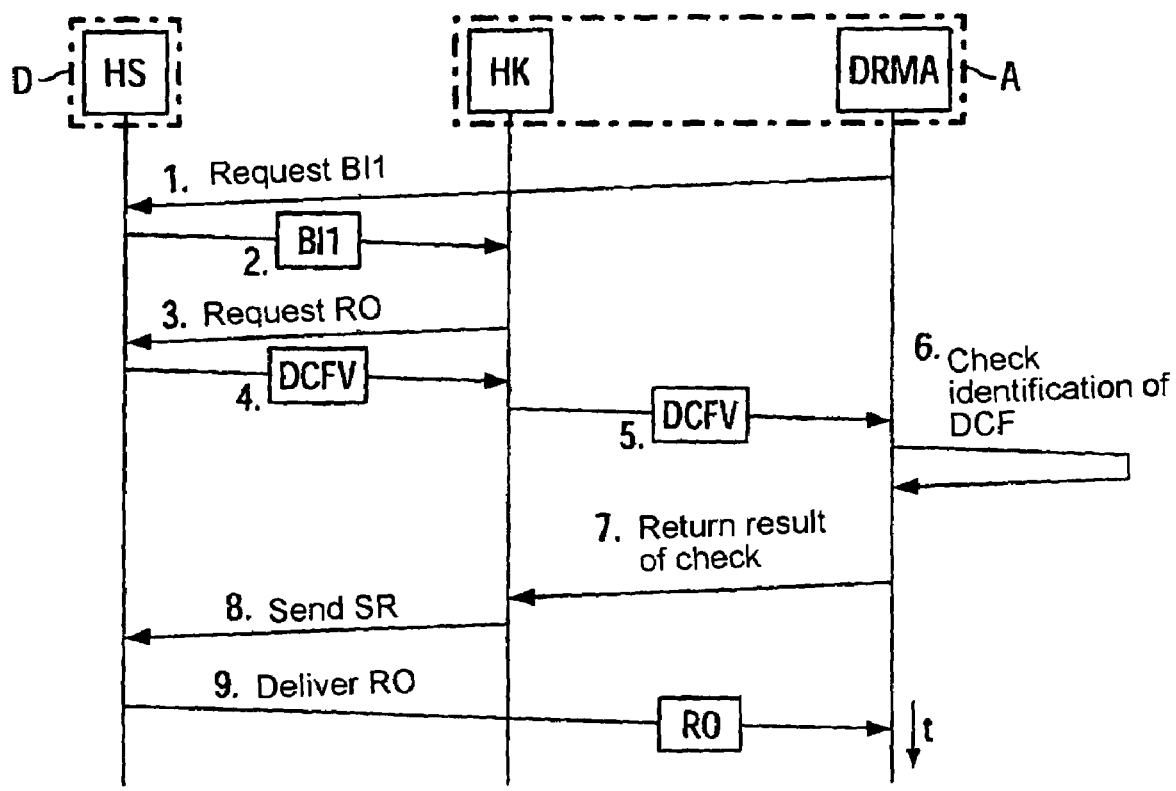
FIG. 2 is a block diagram showing the components involved in a method for downloading or transmitting rights objects including the data flow between the components.

A process flow scheme for illustrating the method for transmitting or downloading rights or a rights object will now be described with reference to FIG. 2, whereby the data flow in time and method sequence are identified by the numbers 1 to 9 on the arrows in FIG. 2. In this case it is assumed that there is already provided on the telecommunications device of a user to which a rights object is to be transmitted an encrypted user data object, packed in a container object, in a memory area of the telecommunications device, which user data object comes, for example, from a data provisioning component pursuant to a method, illustrated in FIG. 1, for downloading user data objects or has been transferred by another telecommunications device. It is further assumed in FIG. 2 that the download server HS according to FIG. 1 is an application on a data provisioning component D of a data provisioning system, while the download client HK and the DRM agent DRMA are applications or software applications on a user's telecommunications device or, as the case may be, mobile phone A to which a specific rights object is to be transmitted.

1.) A resource of the rights provider (data provisioning component D) is requested or invoked by the DRM agent DRMA using the corresponding URL which is specified in the description section of the corresponding container object on the mobile phone A of the user in order to download or transmit a rights object RO. This causes a new download process to start. The purpose of the request is to receive description information which is transmitted to the mobile phone A and evaluated there accordingly by the download client HK and responded to. Alternatively, a browsing session also may take place between the calling of the resource by the DRM agent and the transmission of the description information BI1; i.e., the immediate response to the initial request or inquiry in the agent DRMA includes, not description information, but one or more web pages which describe, for example, an offer for downloading new rights and contain a reference for downloading the description information. However, at the end of the browsing session, following selection of a specific rights object, description information is again requested by the mobile phone A or the DRM agent.

2.) The description information BI1 is transmitted to the mobile phone A and passed according to its type to the download client HK. In this case, the transmission of the description information from the data provisioning component D to the mobile phone A can take the form, for example, of a message in the Short Message Service (SMS), a message in the Multimedia Message Service (MMS), an e-mail or an instant message, etc.

3.) The download client HK presents the information for the user, for example, on a display of the mobile phone A and checks whether the content type or types listed in the description information BI1 can be used by the mobile phone A. As such, a check is made to determine whether the mobile phone A is able to display or play back certain content, such as image data at a particular resolution or color, or also music data. If this is the case, and the user gives his or her approval, the download client HK requests the transmission of the confirmation object DCFV, to which in this example the request for the actual rights object RO is logically linked.

4.) As a response to the request, the download server transmits the confirmation object DCFV to the download client HK.

5.) The download client HK recognizes the type of the confirmation object DCFV, has stored an assignment to the DRM agent DRMA for such object or file type and passes the confirmation object to the DRM agent for checking.

6.) The DRM agent checks whether the checksum (or hash value) contained in the confirmation object DCFV tallies with the checksum (or hash value) of the container object DCF already stored on the mobile phone A. For this purpose, the confirmation object DCFV also contains the identification designation of the container object DCF. The DRM agent DRMA has stored information associated with this identification designation indicating where in the memory of the mobile phone A the corresponding container object is stored, which value the checksum (or hash value) of the container object or the encrypted user data object packed therein has, and whether the check or comparison of the checksum (or hash value) has been completed successfully.

7.) If the matching container object has been found in step 6.) and the checksum (or hash value) has been checked successfully, that is, if the checksum contained in the confirmation object tallies with the checksum of the container object stored on the mobile phone A or the encrypted user data object contained therein, the DRM agent DRMA issues a positive message to the download client HK.

8.) The download client HK sends a status report, to the download server HS in which the result obtained in step 7.) is passed on.

9.) Upon receiving a positive status report the download server transmits the requested rights with the actual rights object RO in, for example, a "push" mode (e.g., via a WAP push) to the mobile phone A. It is entirely possible that a transmission of this kind also may be performed via a message in the MMS or as an e-mail. The DRM agent DRMA now receives the rights object RO and stores it in a special memory area which is protected against unauthorized access. Using the key contained in the rights object RO, the DRM agent DRMA can decrypt the encrypted user data object contained in the container object DCF and finally make it usable for use by the user of the mobile phone. For example, image data contained in the user data object can be displayed on a display device of the mobile phone, music data can be audibly played back or multimedia data such as video clips may be displayed and played back, etc.

Following the above explanation of a general example for transmitting or downloading rights or rights objects from a data provisioning component to a telecommunications device such as a videophone, a more concrete example now will be explained.

Let it be assumed as the starting situation that on the mobile phone (A) there is stored a container object which has reached the mobile phone (A) via superdistribution (i.e. a transmission from a further mobile phone). For example, the container object DCF was transferred to the mobile phone (A) as part of a multimedia message in the Multimedia Messaging Service (MMS) or simply via an infrared interface (IrDA). It is then stored in a memory area provided for data objects or in a file system of the mobile phone (A) and can be identified there as a container object by a special file extension. If the user of the mobile phone (A) activates the container object (for example, by selecting it in a file management application such as an Explorer), the DRM agent is started automatically in order to search for a matching rights object for the selected container object. It is assumed that no rights object has yet been transferred to the mobile phone (A) for the container object, with the result that the DRM agent (DRMA) is not successful in its search for a suitable rights object and proposes to the user to obtain rights or a rights object off the Internet from the associated rights provider and download it to the mobile phone (A). For this purpose, a description section in the container object contains an Internet address or URL of the rights provider. Also stored in the description section of the container object (see also FIG. 3) in addition to the URL of the rights provider is the checksum (or hash value) of the encrypted user data object packed in the container object, by which the integrity or freedom from damage of the container object and, hence, of the packed, encrypted user data object can be checked. If the user selects the URL for downloading new rights for the encrypted user data object, on the one hand the referenced URL is selected and on the other the checksum (or hash value) for the encrypted user data object packed in the container object is determined by the DRM agent in order to verify its integrity. The result of this integrity check is stored by the DRM agent, as is also the identification designation for the container object and its position in the file system on the mobile phone (A).

The invocation of the resource (data provisioning component of a rights provider) at the address specified in the description section of the container object ("rights issuer URL") has a result that depends on the embodiment by the rights provider. Either a web page is returned (e.g., in the HTML (Hypertext Markup Language) format or in another, such as an XML-based, format), a browser application is started on the mobile phone A and a browsing session follows in which the user of the mobile phone (A) is offered an address for starting the download process for new rights. As an alternative to the return of a web page and a following browsing session, the download process can be started directly by retrieval of description information for a specific container object or the user data object contained therein.

The encrypted user data object matching the requested rights can be described in the description information processed by the download client (HK) of the mobile phone (A) just as accurately as if the encrypted user data object itself were to be downloaded. Thus, when downloading new rights, the user of the mobile phone (A) receives the same information as when downloading the encrypted user data object and thus has the same basis on which to make a decision whether to make use of the proposed service rights or not. In contrast to the download process for the encrypted user data object and the associated rights object, however, the type of a confirmation object assigned to the rights object is specified in the description information as content type for the download process. In this way, the download client as well as the user are informed that only the rights object or a confirmation object assigned thereto will be transmitted. The corresponding encrypted user data object therefore already must be stored on the mobile phone (A). In addition, the download client can check on the basis of the other specifications in the description information that relate to the encrypted user data object whether the described encrypted user data object or its content also may be used on the mobile phone (A), i.e., whether attributes such as size, type and further attributes of the unencrypted user data object "match" the device features of the mobile phone (A).

If all the above-mentioned criteria are met and the user decides to download new rights, the download client continues the download process by requesting the confirmation object assigned to the rights object from the download server (HS). The download server responds and sends the confirmation object to the download client, which recognizes the object type of the confirmation object and immediately passes on the confirmation object to the DRM agent. The DRM agent receives the confirmation object, interprets the identification designation for the relevant container object contained therein in order to determine which container object needs to be checked and compares the checksum (or hash value) received in the confirmation object with the corresponding value contained in the description section of the container object or with the previously determined value of the encrypted user data object in the container object. If the checksums (or hash values) tally, it is confirmed that the encrypted user data object in the container object will be usable with the previously selected rights object. The DRM agent then signals a positive check of the confirmation object to the download client. The download client thereupon sends the download server a status report in which the corresponding status value or status report causes the download server to send the previously selected rights object, such as via a WAP push, to the mobile phone (A) and possibly to charge the user for the associated service; i.e., the use of the user data object in the container object. This can be accomplished by the sending, by the download server, of an instruction to a billing system of the mobile radio network in which the mobile phone (A) resides to charge the user of the mobile phone (A) for the downloaded rights or rights object; for example, using the traditional telecommunications call billing system.

Following the arrival of the rights objects on the mobile phone (A), a rights object is passed on, in turn, according to its object type immediately to the DRM agent and managed by the latter. The object can be located and opened in the memory of the mobile phone (A) via a management data record or an identification designation of the container object. Next, the key contained in the new rights object is used for decrypting the encrypted user data object in the container object and the user data object then can be used.

Figure 3:
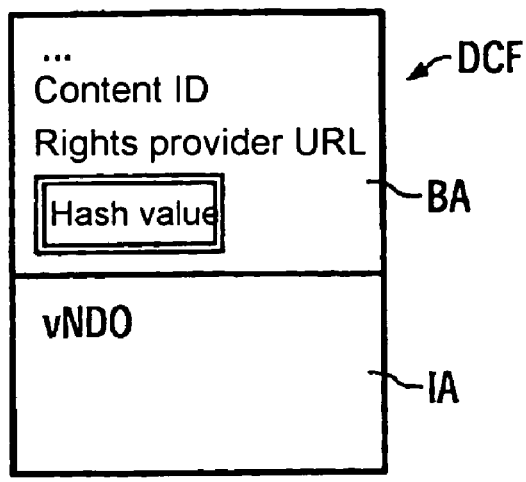
FIG. 3 shows a schematic representation of a container object according to an embodiment of the present invention.

Reference now will be made to FIG. 3, which shows a container object DCF which can be used, for example, in a method illustrated in FIG. 2. The container object DCF includes a content section IA, in which an encrypted user data object vNDO is stored, and a description section BA, in which there are provided an identification designation "Content ID" for the container object DCF, a rights provider URL, which can be used for requesting new rights, and a checksum (or hash value) via which the integrity or freedom from damage of the encrypted user data object or the entire container object can be checked.

Figure 4:
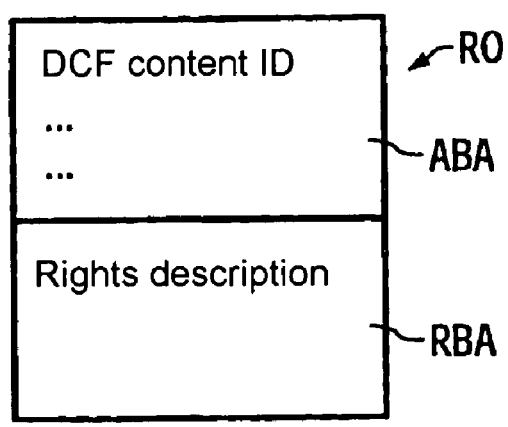
FIG. 4 shows a schematic representation of a rights object according to an embodiment of the present invention.

Reference now will be made to FIG. 4, which shows a rights object RO which can be used, for example, in the method illustrated in FIG. 2. In a general description section ABA, the rights object RO contains, in addition to other possible identifiers or elements, an identification designation "Content ID", which serves to identify the associated container object DCF. The rights object RO also contains a rights description section RBA, which contains a key for decrypting the encrypted user data object vNDO contained in the container object DCF and also a description of the rights for usage of the encrypted user data object vNDO. The description of the rights includes, as already mentioned above, the definition of the rights which the user receives by way of the transferred rights object in order to use the encrypted user data object, specifying, for example, that the user may only listen to music data even if image or video information is also contained in the encrypted user data object. However, the user also can receive the rights for full use of the encrypted user data object, etc.

Figure 5:
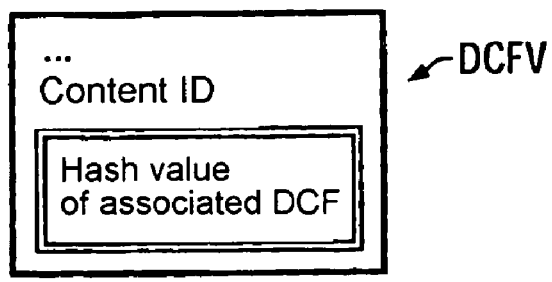
FIG. 5 shows a schematic representation of a confirmation object assigned to the rights object according to an embodiment of the present invention.

Reference now will be made to FIG. 5, which shows a confirmation object DCFV assigned to the rights object RO depicted in FIG. 4. Important elements of the confirmation object DCFV are firstly the identification designation "Content ID" for referencing the associated container object DCF, as has been explained, for example, in relation to FIG. 2, and secondly the checksum (or hash value) which has to be compared with the corresponding value of the container object DCF in order to guarantee correct assignment of a rights object RO that is to be newly downloaded and a container object DCF already present on a telecommunications device of a user.

It should be noted, in conclusion, that although in the illustrated embodiments of a method for downloading rights objects it has always been assumed that while a container object with an encrypted user data object contained therein is already stored on the telecommunications device, there is not yet an associated rights object present to enable the encrypted user data object to be used. It also is possible, however, that in addition to the container object with the encrypted user data object contained therein, a first rights object is already stored on the telecommunications device of the user, which first rights object thus enables the use of the encrypted user data object based on the rights described therein. However, if these rights of the first rights object permit a partial use of the encrypted user data object, then it is also possible that the user of the telecommunications device would like to download or transmit a second rights object to his or her telecommunications device which allows more extensive or full use of the encrypted user data object. In such a case, the user can request the second rights object, as described, for example, in general terms in relation to FIG. 2, and after checking by a confirmation object assigned to the second rights object, download the second rights object to his or her telecommunications device in order to enable more extensive use of the encrypted user data object on his or her telecommunications device ("rights refresh").

Although the present invention has been described with reference to specific embodiments, those of skill in the art will recognize that changes may be made thereto without departing from the spirit and scope of the present invention as set forth in the hereafter appended claims.

The invention claimed is:

1. A method for handling encrypted user data objects, the method comprising:
   generating a rights object for an encrypted user data object by a data provisioning component, the rights object having assignment information for assigning the rights object to a container object having an encrypted user data object, decryption information for decrypting the encrypted user data object, and rights information for describing usage rights of the encrypted user data object;
   generating a confirmation object assigned to the rights object by the data provisioning component, the confirmation object having assignment information for assigning the rights object to an encrypted user data object and a checksum of the encrypted user data object;
   transmitting a container object to a first telecommunications device, the container object having a content section in which an encrypted user data object is provided, and a description section in which a determined checksum of the encrypted user data object is provided;

extracting the checksum from the description section of the container object;
re-determining the checksum of the encrypted user data object provided in the content section of the container object;
comparing the extracted checksum with the re-determined checksum so that, should the two checksums tally, an error-free transmission of the encrypted user data object may be concluded;
requesting, via the first telecommunications device, the confirmation object assigned to the rights object to be transmitted to the first telecommunications device;
transmitting the confirmation object from the data provisioning component to the first telecommunications device;
extracting the checksum from the confirmation object; and
comparing the checksum extracted from the confirmation object with the redetermined checksum so that, should the two checksums tally, compatibility of the rights object assigned to the confirmation object and the encrypted user data object transmitted to the first telecommunications device in the container object may be concluded.

2. A method for handling encrypted user data objects as claimed in claim 1, wherein the data provisioning component provides user data objects which are processed, the processing comprising:
encrypting a user data object provided on the data provisioning component; determining a checksum of the encrypted user data object;
generating a container object having a content section in which the encrypted user data object is provided, and a description section in which the determined checksum of the encrypted user data object is provided; and
transmitting the container object from the data provisioning component to the first telecommunications device.

3. A method for handling encrypted user data objects as claimed in claim 1, wherein the container object is transmitted to the first telecommunications device by the data provisioning component via at least one further data provisioning component or at least one further telecommunications device.

4. A method for handling encrypted user data objects as claimed in claim 1, further comprising submitting a request, via the first telecommunications device, to transmit the rights object generated by the data provisioning component to the first telecommunications device.

5. A method for handling encrypted user data objects as claimed in claim 1, wherein the rights object is transmitted by the data provisioning component to the first telecommunications device if compatibility has been established based on an agreement of the checksums of the confirmation object assigned to the rights object and the encrypted user data object transmitted to the first telecommunications device in the container object.

6. A method for handling encrypted user data objects as claimed in claim 1, wherein following a successful comparison of the extracted checksum with the re-determined checksum, the method further comprises:
requesting description information relating to the content of the encrypted user data object from the data provisioning component;
transmitting the requested description information from the data provisioning component to the first telecommunications device; and checking whether the content having the attributes specified in the description information can be used by the first telecommunications device.

7. A method for handling encrypted user data objects, the method comprising:
providing an encrypted user data object in a first telecommunications device;
requesting description information relating to content of the encrypted user data object from a data provisioning component;
transmitting the requested description information of the container object from the data provisioning component to the first telecommunications device;
checking whether the content having the attributes specified in the description information can be used by the first telecommunications device; and
extracting the checksum from the description section;
re-determining the checksum of the encrypted user data object provided in the content section of the container object;
requesting from the data provisioning component, upon successful checking of the attributes specified in the description information, a, the confirmation object having assignment information for assigning the rights object to an encrypted user data object and a checksum of the encrypted user data object
extracting the checksum from the confirmation object; and
comparing the checksum extracted from the confirmation object with the re-determined checksum so that should the two checksums tally, compatibility of the rights object assigned to the confirmation object and the encrypted user data object transmitted to the first telecommunications device in the container object may be concluded.

8. A method for handling encrypted user data objects as claimed in claim 7, wherein the rights object is transmitted by the data provisioning component to the first telecommunications device upon successful checking of the compatibility of the rights object and the encrypted user data object.

9. A method for handling encrypted user data objects as claimed in claim 7, wherein the encrypted user data object is provided in a content section of a container object.

10. A method for handling encrypted user data objects as claimed in claim 9, wherein the container object further includes a description section in which a checksum of the encrypted user data object is provided.

11. A method for handling encrypted user data objects as claimed in claim 10, wherein an address of the data provisioning component is also provided in the description section of the container object for purposes of requesting at least one of the description information and the confirmation object.

12. A method for handling encrypted user data objects as claimed in claim 10, wherein the confirmation object has a checksum of the encrypted user data object, the compatibility of the rights object and the encrypted user data object being checked, the checking comprising:
extracting the checksum from the confirmation object; and
comparing the checksum extracted from the confirmation object with the checksum provided in the description section of the container object so that, should the two checksums tally, the compatibility of the rights object assigned to the confirmation object and the encrypted user data object provided in the container object transmitted to the first telecommunications device may be concluded.

13. A method for handling encrypted user data objects as claimed in claim 1, wherein at least one of:
a first confirmation message is sent by the first telecommunications device to the data provisioning component if the compatibility of the rights object assigned to the confirmation object and the encrypted user data object transmitted to the first telecommunications device in the container object has been established; and a second confirmation message is sent if the first telecommunications device has received the rights object from the data provisioning component.

14. A method for handling encrypted user data objects as claimed in claim 4, further comprising transmitting charging information relating to the transmitted rights object to a telecommunications subscriber assigned to the first telecommunications device.

15. A method for handling encrypted user data objects as claimed in claim 1, wherein the checksum is a hash value calculated according to a hash algorithm.

16. A method for handling encrypted user data objects as claimed in claim 3, wherein at least one of the first telecommunications device and the at least one further telecommunications device are part of a first telecommunications mobile radio network.

17. A method for handling encrypted user data objects as claimed in claim 1, wherein the data provisioning component is part of a second telecommunications network.

18. A method for handling encrypted user data objects as claimed in claim 3, wherein at least one of the first telecommunications device and the at least one further telecommunications device include a radio module.

19. A method for handling encrypted user data objects as claimed in claim 18, wherein the radio module is one of a mobile phone, a cordless telephone and a portable computer.

20. A method for handling encrypted user data objects as claimed in claim 3, wherein data is transmitted between the first telecommunications device and the at least one further telecommunications device via WAP protocols.

21. A method for handling encrypted user data objects as claimed in claim 3, wherein data is transmitted between the first telecommunications device and the at least one further telecommunications device via Internet protocols.

22. A method for handling encrypted user data objects as claimed in claim 21, wherein the Internet protocol is Hypertext Transfer protocol.

23. A method for handling encrypted user data objects as claimed in claim 1, wherein the user data objects include at least one of text information, audio information, video information, executable programs and software modules.

24. A telecommunications system for handling encrypted user data objects, comprising:

a data provisioning system having at least one data provisioning component; and at least one first telecommunications device;

wherein a rights object is generated for an encrypted user data object by the data provisioning component, the rights object having assignment information for assigning the rights object to a container object having an encrypted user data object, decryption information for decrypting the encrypted user data object, and rights information for describing usage rights of the encrypted user data object;

wherein a confirmation object assigned to the rights object is generated by the data provisioning component, the confirmation object having assignment information for assigning the rights object to an encrypted user data object and the checksum of the encrypted user data object;

wherein a container object is transmitted to the first telecommunications device, the container object having a content section in which an encrypted user data object is provided, and a description section in which a determined checksum of the encrypted user data object is provided;

wherein the checksum is extracted from the description section of the container object;

wherein the checksum of the encrypted user data object provided in the content section of the container object is re-determined;

wherein the extracted checksum is compared with the re-determined checksum so that, should the two checksums tally, an error-free transmission of the encrypted user data object may be concluded;

wherein the first telecommunication device requests the confirmation object assigned to the rights object to be transmitted to the first telecommunications device;

wherein the confirmation object is transmitted from the data provisioning component to the first telecommunications device;

wherein the checksum from the confirmation object is extracted; and wherein the checksum extracted from the confirmation object is compared with the re-determined checksum so that, should the two checksums tally, compatibility of the rights object assigned to the confirmation object and the encrypted user data object transmitted to the first telecommunications device in the container object may be concluded.

* * * * *